(12) United States Patent
Yao et al.

(10) Patent No.: US 11,808,739 B1
(45) Date of Patent: Nov. 7, 2023

(54) MONITORING DAMAGE OF ELECTROFUSION JOINTS

(71) Applicant: ZHEJIANG UNIVERSITY, Zhejiang (CN)

(72) Inventors: Riwu Yao, Zhejiang (CN); Jianfeng Shi, Zhejiang (CN); Xingchen Liu, Zhejiang (CN); Jinyang Zheng, Zhejiang (CN); Zhoutian Ge, Zhejiang (CN); Zhongzhen Wang, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/111,315

(22) Filed: Feb. 17, 2023

Related U.S. Application Data

(63) Continuation of application No. PCT/CN2022/141897, filed on Dec. 26, 2022.

(30) Foreign Application Priority Data

Jul. 1, 2022 (CN) .......................... 202210768293.2

(51) Int. Cl.
*G01N 3/06* (2006.01)
*G01N 3/12* (2006.01)

(52) U.S. Cl.
CPC ............ *G01N 3/066* (2013.01); *G01N 3/12* (2013.01); *G01N 2203/0067* (2013.01); *G01N 2203/0296* (2013.01); *G01N 2203/0617* (2013.01)

(58) Field of Classification Search
CPC ............ G01N 3/12; G01N 2203/0617; G01N 2203/0296; G01N 3/066; G01N 2203/0067
See application file for complete search history.

(56) References Cited

U.S. PATENT DOCUMENTS

| | | | |
|---|---|---|---|
| 6,406,063 B1 * | 6/2002 | Pfeiffer | B29D 23/005 285/21.2 |
| 2020/0088688 A1 | 3/2020 | Crosswell et al. | |
| 2020/0276771 A1 | 9/2020 | Shi et al. | |

FOREIGN PATENT DOCUMENTS

| | | |
|---|---|---|
| CN | 101769728 | 7/2010 |
| CN | 102478533 | 5/2012 |

(Continued)

OTHER PUBLICATIONS

[No Author Listed], "Intelligent Pipe Fitting System for Non-metallic Pipes," Zhejiang University, May 2021, 14 pages (Submitted with Machine/Partial Translation).

(Continued)

*Primary Examiner* — Jennifer Bahls
(74) *Attorney, Agent, or Firm* — Fish & Richardson P.C.

(57) ABSTRACT

Methods, apparatus, and systems for monitoring damage of electrofusion joints of a non-metallic pipe are provided. In one aspect, a system includes: a data collector for collecting monitored resistance data of an electrofusion joint; one or more processors; and one or more memories having instructions executable by the one or more processors to perform operations including: storing a first damage critical value, a second damage critical value, and the monitored resistance data; processing the monitored resistance data to obtain a first monitored value and a second monitored value; comparing the first monitored value with the first damage critical value and the second monitored value with the second damage critical value; and determining the electrofusion joint is damaged in response to determining at least one of: the first monitored value being greater than the first damage critical value or the second monitored value being greater than the second damage critical value.

18 Claims, 8 Drawing Sheets

(56) References Cited

FOREIGN PATENT DOCUMENTS

| | | | | |
|---|---|---|---|---|
| CN | 102539325 | 7/2012 | | |
| CN | 102914427 | 2/2013 | | |
| CN | 108362771 | 8/2018 | | |
| CN | 109101742 | 12/2018 | | |
| CN | 109827014 | 5/2019 | | |
| CN | 111766272 | 10/2020 | | |
| CN | 112361231 | 2/2021 | | |
| CN | 114200019 | 3/2022 | | |
| CN | 114813848 | 7/2022 | | |
| EP | 3045888 | 7/2016 | | |
| GB | 2296568 A | * 7/1996 | ........... | B29C 65/342 |
| JP | H11254537 | 9/1999 | | |
| JP | 2000085016 | 3/2000 | | |
| JP | 2003320587 | 11/2003 | | |
| WO | WO 9619718 | 6/1996 | | |

OTHER PUBLICATIONS

Office Action and Search Report in Chinese Application No. 202210768293.2, dated Aug. 11, 2022, 24 pages (Submitted with Machine/Partial Translation).

Shi et al., "Strength analysis on hybrid welding interface of polymer and short carbon fiber reinforced composite," J Mater Sci., Sep. 2021, 56(26):14556-14569.

International Search Report and Written Opinion in International Appln. No. PCT/CN2022/141897, dated Mar. 30, 2023, 18 pages (with machine translation).

\* cited by examiner

MONITORING DAMAGE OF ELECTROFUSION JOINTS

CROSS-REFERENCE TO RELATED APPLICATIONS

This application is a continuation application of international PCT Application No. PCT/CN2022/141897 filed on Dec. 26, 2022, which claims priority to Chinese patent application No. 202210768293.2 filed on Jul. 1, 2022. The entire contents of these applications are incorporated herein by reference.

TECHNICAL FIELD

The present disclosure relates to the field of pipe monitoring and in particular to systems and methods for monitoring damage of electrofusion joints of non-metallic pipes.

BACKGROUND

In the connection technologies of non-metallic pipes, electrofusion connection technology is a current common connection method due to its advantages of easy onsite installation, high operation standard, reliable performance, or the like. At present, with use of fiber reinforced layer and steel wire mesh frame reinforcement, the bearing capacity of some large-diameter non-metallic pipes has exceeded 6.4 MPa, and the strength of the electrofusion joints has become a major factor limiting the development of high pressure composite pipes. According to the analysis of Plastic Pipe Database Committee (PPDC) in the United States for the failure causes of the pipe systems, 53% of pipe system failures occur at the pipe fittings. Hence, the strength of the electrofusion joints has become a factor limiting the development of non-metallic pipe systems. On the other hand, with application of the non-metallic pipes in the fields of hydrogen, fuel gas, nuclear power, or the like, higher requirements are proposed for the safety of the pipe systems.

SUMMARY

Implementation of the present disclosure provide methods, apparatuses, and systems for monitoring damage of electrofusion joints, which can solve at least one of the technical problems in the related arts.

One aspect of the present disclosure features a system for monitoring damage of electrofusion joints of a non-metallic pipe. The system includes: a data collector connected to an electrofusion joint of the non-metallic pipe through a pair of monitoring electrodes and configured to collect monitored resistance data of a body material of the electrofusion joint between the pair of monitoring electrodes; one or more processors; and one or more memories coupled to the one or more processors and having instructions stored thereon that are executable by the one or more processors to perform one or more operations comprising: obtaining a first damage critical value, a second damage critical value, and the monitored resistance data collected by the data collector; processing the monitored resistance data to obtain a first monitored value and a second monitored value, where the first monitored value and the second monitored value are real-time monitored values and respectively correspond to the first damage critical value and the second damage critical value; comparing the first monitored value with the first damage critical value and comparing the second monitored value with the second damage critical value; and determining that the electrofusion joint is damaged in response to determining at least one of: the first monitored value being greater than the first damage critical value or the second monitored value being greater than the second damage critical value. The first damage critical value and the second damage critical value are different values selected from a plurality of characteristic values comprising: a monitored resistance value of the electrofusion joint on damage, indicating a resistance value of the electrofusion joint monitored when damage occurs to the electrofusion joint; a change value of monitored resistance of the electrofusion joint on damage, indicating a value obtained by subtracting an initial resistance value from the monitored resistance value of the electrofusion joint when damage occurs to the electrofusion joint; a change rate of monitored resistance value of the electrofusion joint on damage, indicating a ratio between an absolute change value of monitored resistance of the electrofusion joint when damage occurs to the electrofusion joint and the initial resistance value, and a slope change rate of relative change curve of monitored resistances of the electrofusion joint on damage, indicating a ratio between slopes of a relative change curve of monitored resistances of the electrofusion joint within two time periods respectively before and after a time when damage occurs to the electrofusion joint. The first damage critical value and the second damage critical value are determined based on a monitored resistance change curve of one or more electrofusion joint specimens and an internal pressure value on damage of electrofusion joint specimens. The internal pressure value on damage of the electrofusion joint specimens is determined based on a damage degree-internal pressure curve, where the damage degree-internal pressure curve quantitatively represents a damage degree of the electrofusion joint specimens after an internal pressure is loaded, $D_i =$ $$D_i = 1 - \frac{P_i}{P_{max}},$$

where $D_i$ represents a damage degree of the electrofusion joint specimen after an internal pressure of i MPa is loaded, $P_i$ represents a bearing strength of the electrofusion joint specimen after the internal pressure of i MPa is loaded, and $P_{max}$ represents a maximum bearing strength of the electrofusion joint specimen without damage; for each of the electrofusion joint specimens, and where the monitored resistance change curve of the electrofusion joint specimen is obtained by applying an internal pressure load to the electrofusion joint specimen and accordingly recording the monitored resistance value data of the electrofusion joint specimen, and where the monitored resistance value data at least includes an initial resistance value, a resistance value on damage, and resistance change values within a plurality of time periods between an initial time and a damage time when damage occurs to the electrofusion joint specimen.

In some embodiments, the electrofusion joint includes a polymer matrix and a conductive filler, where the conductive filler is uniformly distributed in the polymer matrix to form a conductive network. The polymer matrix includes at least one of polyethylene, polypropylene, polyvinyl chloride, or polyamide; and the conductive filler includes at least one of carbon nanotube, carbon nanofiber, carbon fiber, metal fiber, metal-plated glass fiber, graphene, or carbon black.

In some embodiments, the electrofusion joint specimen and the electrofusion joint are substantially same in material and structure.

In some embodiments, the internal pressure value on damage of the electrofusion joint is determined by: setting a critical value of the damage degree of the electrofusion joint; and according to the damage degree-internal pressure curve, determining the internal pressure value on damage of the electrofusion joint as the internal pressure corresponding to the critical value of the damage degree of the electrofusion joint.

In some embodiments, the first damage critical value and the second damage critical value are obtained by: applying an internal pressure load to a plurality of electrofusion joint specimens; monitoring resistances of the plurality of electrofusion joint specimens; for each of the characteristic values, calculating an average value or a minimum value of the characteristic value according to the monitored resistances of the plurality of electrofusion joint specimens on damage; and determining the first damage critical value based on the average value or the minimum value of a first one of the characteristic values, and determining the second damage critical value based on the average value or the minimum value of a second one of the characteristic values.

In some embodiments, the first monitored value is a change rate of monitored resistance value of the electrofusion joint; and the second monitored value is a slope change rate of relative change curve of monitored resistance of the electrofusion joint.

In some embodiments, the system is connected to a plurality of electrofusion joints of the non-metallic pipe and configured to perform damage monitoring on the plurality of electrofusion joints at a same time.

In some embodiments, the system further includes a result display, where the operations include: displaying information indicating whether an electrofusion joint of the non-metallic pipe is damaged on the result display.

Another aspect of the present disclosure features a method of monitoring damage of electrofusion joints of a non-metallic pipe, including: for each of one or more electrofusion joint specimens, applying an internal pressure load to the electrofusion joint specimen; recording monitored resistance value data of the electrofusion joint specimen to obtain a monitored resistance change curve for the electrofusion joint specimen, where the monitored resistance value data at least includes an initial resistance value, a resistance value on damage, and resistance change values within a plurality of time periods between an initial time and a damage time when damage occurs to the electrofusion joint specimen; applying an internal pressure load to a plurality of electrofusion joint specimens to produce damage to the plurality of electrofusion joint specimens; measuring a bearing strength $P_i$ of the plurality of electrofusion joint specimens after damage through burst tests to obtain a damage degree-internal pressure curve of electrofusion joint, where the damage degree-internal pressure curve quantitatively represents a damage degree D of the electrofusion joint specimen after an internal pressure of i MPa is loaded; according to the monitored resistance change curve and the damage degree-internal pressure curve for the electrofusion joint specimen, obtaining a first damage critical value and a second damage critical value of the electrofusion joint specimen on damage; storing the first damage critical value and the second damage critical value in a database; monitoring an electrofusion joint by connecting a pair of monitoring electrodes to the electrofusion joint, collecting monitored resistance data of the electrofusion joint; obtaining a first monitored value and a second monitored value based on the monitored resistance data; comparing the first monitored value with the first damage critical value and comparing the second monitored value with the second damage critical value; and determining that the electrofusion joint is damaged in response to determining at least one of the first monitored value being greater than the first damage critical value or the second monitored value being greater than the second damage critical value.

In some embodiments, the first damage critical value is a ratio between an absolute change value of a resistance value monitored when damage occurs to the electrofusion joint specimen relative to the initial resistance value and the initial resistance value; the second damage critical value is a ratio between slopes of a relative change curve of monitored resistances for the electrofusion joint within two time periods respectively before and after the time when damage occurs to the electrofusion joint specimen; the first monitored value is a change rate of monitored resistance value of electrofusion joint; the second monitored value is a slope change rate of relative change curve of monitored resistances for electrofusion joint.

In some embodiments, the electrofusion joint specimen and the electrofusion joint are substantially same in material and structure.

Another aspect of the present disclosure features an apparatus including: one or more processors; and one or more memories coupled to the one or more processors and having instructions stored thereon that are executable by the one or more processors to perform one or more operations comprising: obtaining a first damage critical value, a second damage critical value, and monitored resistance data of an electrofusion joint of a non-metallic pipe; processing the monitored resistance data to obtain a first monitored value and a second monitored value, where the first monitored value and the second monitored value are real-time monitored values and respectively correspond to the first damage critical value and the second damage critical value; comparing the first monitored value with the first damage critical value and comparing the second monitored value with the second damage critical value; and determining that the electrofusion joint is damaged in response to determining at least one of: the first monitored value being greater than the first damage critical value or the second monitored value being greater than the second damage critical value, where the first damage critical value and the second damage critical value are different values selected from a plurality of characteristic values comprising: a monitored resistance value of the electrofusion joint on damage, indicating a resistance value of the electrofusion joint monitored when damage occurs to the electrofusion joint, a change value of monitored resistance of the electrofusion joint on damage, indicating a value obtained by subtracting an initial resistance value from the monitored resistance value of the electrofusion joint when damage occurs to the electrofusion joint, a change rate of monitored resistance value of the electrofusion joint on damage, indicating a ratio between an absolute change value of monitored resistance of the electrofusion joint when damage occurs to the electrofusion joint and the initial resistance value, and a slope change rate of relative change curve of monitored resistances of the electrofusion joint on damage, indicating a ratio between slopes of a relative change curve of monitored resistances of the electrofusion joint within two time periods respectively before and after a time when damage occurs to the electrofusion joint, where the first damage critical value and the second damage critical value are determined based on a monitored resistance change curve of one or more electrofusion joint specimens and an internal pressure value on damage of electrofusion joint specimens, where the internal pressure value on damage of the electrofusion joint specimens is determined based on a damage degree-internal pressure curve, where the damage degree-internal pressure curve quantitatively represents a damage degree of the electrofusion joint specimens after an internal pressure is loaded, $$D_i = 1 - \frac{P_i}{P_{max}},$$

where $D_i$ represents a damage degree of the electrofusion joint specimen after an internal pressure of i MPa is loaded, $P_i$ represents a bearing strength of the electrofusion joint specimen after the internal pressure of i MPa is loaded, and $P_{max}$ represents a maximum bearing strength of the electrofusion joint specimen without damage, and where the monitored resistance change curve of the electrofusion joint specimen is obtained by applying an internal pressure load to the electrofusion joint specimen and accordingly recording monitored resistance value data of the electrofusion joint specimen, and where the monitored resistance value data at least includes an initial resistance value, a resistance value on damage, and resistance change values within a plurality of time periods between an initial time and a damage time when damage occurs to the electrofusion joint specimen.

In some embodiments, the electrofusion joint includes a polymer matrix and a conductive filler, where the conductive filler is uniformly distributed in the polymer matrix to form a conductive network, where the polymer matrix includes at least one of polyethylene, polypropylene, polyvinyl chloride, or polyamide, and where the conductive filler includes at least one of carbon nanotube, carbon nanofiber, carbon fiber, metal fiber, metal-plated glass fiber, graphene, or carbon black.

In some embodiments, the electrofusion joint specimen and the electrofusion joint are substantially same in material and structure.

In some embodiments, the internal pressure value on damage of the electrofusion joint is determined by: setting a critical value of the damage degree of the electrofusion joint; and according to the damage degree-internal pressure curve, determining the internal pressure value on damage of the electrofusion joint as the internal pressure corresponding to the critical value of the damage degree of the electrofusion joint.

In some embodiments, the first damage critical value and the second damage critical value are obtained by: applying an internal pressure load to a plurality of electrofusion joint specimens; monitoring resistances of the plurality of electrofusion joint specimens; and for each of the characteristic values, calculating an average value or a minimum value of the characteristic value according to the monitored resistances of the plurality of electrofusion joint specimens on damage; and determining the first damage critical value based on the average value or the minimum value of a first one of the characteristic values, and determining the second damage critical value based on the average value or the minimum value of a second one of the characteristic values.

In some embodiments, the first monitored value is a change rate of monitored resistance value of electrofusion joint, and where the second monitored value is a slope change rate of relative change curve of monitored resistances of electrofusion joint.

In some embodiments, the operations further include: receiving respective monitored resistance data of a plurality of electrofusion joints of the non-metallic pipe at a same time; and determining whether each of the plurality of electrofusion joints is damaged based on the respective monitored resistance data of the electrofusion joint.

In some embodiments, the operations further include: displaying information indicating whether an electrofusion joint of the non-metallic pipe is damaged on a result display.

The additional aspects and advantages of the present disclosure will be partially set out in the following descriptions and are partially apparent from the following descriptions or understood from the practice of the present disclosure.

BRIEF DESCRIPTION OF THE DRAWINGS

FIG. 6(a) is a curve illustrating a relationship between the bearing strength and the internal pressure of electrofusion joints, and FIG. 6(b) is a curve illustrating a relationship between the damage degree and the internal pressure of electrofusion joints.

Figure 1:
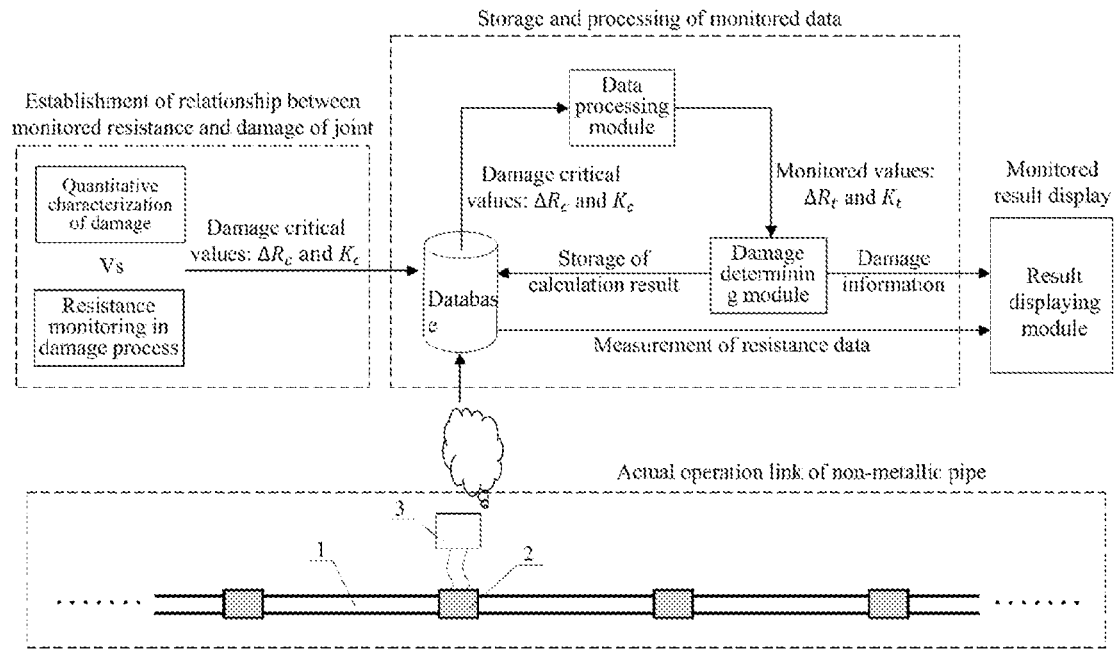
FIG. 1 is a frame diagram illustrating a system for monitoring damage of electrofusion joints according to one or more embodiments of the present disclosure.

Numerals of drawings are described below: pipe 1, electrofusion joint 2, data collecting module 3, paired monitoring electrodes 4, segmented resistance wire 5.

DETAILED DESCRIPTION OF THE EMBODIMENTS

The embodiments of the present disclosure will be set forth in details below with examples illustrated in the drawings, where same or similar numerals represent same or similar elements or elements having same or similar functions throughout. The embodiments described by referring to the accompanying drawings are only illustrative and are intended to explain the present disclosure rather than understood as limiting of the present disclosure.

FIGS. 1 to 11 are schematic diagrams of the embodiments of the present disclosure. But, the specific technical forms involved in the present disclosure may be implemented in other similar ways and are not limited to frame and sequence shown in FIGS. 1 to 11. More precisely, the flow shown in the present disclosure is a better way to fully and thoroughly understand the technical route of the present disclosure in the technical field to which the present disclosure belongs.

Unless otherwise defined in the present disclosure, all technical and scientific terms used in the present disclosure have the same meaning as those skilled in the art usually understand. The terms used in the contents and implementation route of the present disclosure are only used to better express the specific steps in the technical flow of the present disclosure rather than limited to the meanings of the terms.

If reasonable, the embodiments of the implementations of the present disclosure may be mutually combined.

To increase a bearing strength of electrofusion joints and realize safety monitoring for the electrofusion joints, the team of the inventor firstly proposes a short carbon fiber-reinforced plastic electrofusion pipe fitting with strain self-monitoring function (refer to Chinese patent application ZL201910147997.6). In the present application, the mechanical strength of the body material of the electrofusion joint can be increased by filling carbon fibers in the polymer matrix, thereby improve the bearing strength of the electrofusion joint. On the other hand, based on the excellent conductivity of the carbon fibers, a micro conductive network is formed in the body material of the electrofusion joint such that the body material of the electrofusion joint has electrical sensing characteristics, thus achieving strain self-monitoring of the electrofusion joint based on resistance measurement. The current researches on such electrofusion joints mainly focus on aspects such as preparation process (refer to Chinese patent application ZL201911289769.9), electrode arrangement (refer to Chinese patent application ZL202110042251.6), module structure (refer to Chinese patent applications ZL202010793068.5 and ZL201911403395.9) of the electrofusion joints, or the like, so as to increase the structural reinforcement effect and the monitored resistance reliability of the electrofusion joints.

In existing research on monitoring an electrofusion joint based on resistance measurement, a resistance change of the electrofusion joint under an internal pressure can be monitored. However, at present, a method of effectively determining a damage state of an electrofusion joint based on a monitored resistance change of the electrofusion joint has not been disclosed. This is because the damage monitoring effect of the conductive composite electrofusion joint is affected by multiple factors such as performance of the body material of the electrofusion joint, the joint structure and the load type. For example, in terms of material, a volume conductivity of the conductive composite material of the body of the electrofusion joint changes with a stress level of the material; in terms of structure, obvious stress concentration is present in an inner cold welding zone of the electrofusion joint as a structural discontinuity; in terms of loading, the electrofusion joint bears complex loads such as an internal pressure, an axial load, gravity, or the like. On the other hand, a precondition for achieving damage monitoring for the electrofusion joint is to quantitatively represent a damage degree of the electrofusion joint. At present, no researches on quantitative representation of the damage to the electrofusion joints are conducted on both the polymer electrofusion joints and the conductive composite electrofusion joints.

Implementations of the present disclosure provide methods and systems for monitoring damage of electrofusion joints of a non-metallic pipe. Thus, based on the methods and systems, a damage state of an electrofusion joint can be monitored and evaluated in real time to increase the safety and reliability of the non-metallic pipe.

FIG. 1 is a frame diagram illustrating a system for monitoring damage of electrofusion joints according to one or more embodiments of the present disclosure. As shown in FIG. 1, the system can be used to perform damage monitoring on a conductive electrofusion joint of a non-metallic pipe. The system includes a data collecting module 3, a database, a data processing module and a damage determining module. The system can include one or more processors and one or more memories coupled to the one or more processors and having instructions stored thereon that are executable by the one or more processors to implement one or more functions of the database, the data processing module, and the damage determining module.

In an embodiment, a pipe 1 may be a non-metallic pipe or a non-metallic composite pipe. For example, the pipe 1 may be a polyethylene pipe, a metal-reinforced polyethylene pipe, a PVC pipe, a polypropylene pipe, a polyamide pipe, or the like.

The data collecting module 3 can be a data collector configured to measure a monitored resistance of the electrofusion joint, and collect and transmit resistance data. The data collecting module 3 can measure monitored resistances of a plurality of electrofusion joints at the same time to reduce the number of the data collecting modules 3 in a pipeline. For example, the data collecting module 3 includes, but is not limited to, a multimeter with data transmission function, a data logger with data transmission function, or an electrical resistance measuring instrument with data transmission function, etc.

The data collecting module 3 can be connected to a to-be-monitored electrofusion joint 2 through a pair of monitoring electrodes and is configured to collect monitored resistance data of a body material of the electrofusion joint between the pair of monitoring electrodes. The to-be-monitored electrofusion joint may be a conductive electrofusion joint of a non-metallic pipe.

In an embodiment, the body material of the to-be-monitored electrofusion joint 2 can be a filled conductive composite material, where the matrix is a polymer material such as polyethylene and polypropylene, and the filler is a conductive filler such as carbon nanotube, carbon nanofiber, carbon fiber, metal fiber, metal-plated glass fiber, graphene, or carbon black. The conductive filler can be uniformly distributed in the polymer matrix to form a micro conductive network, so as to increase the conductivity of the composite material. Paired monitoring electrodes are bonded to a surface of the electrofusion joint to measure a resistance of the body material of the electrofusion joint between the two monitoring electrodes. When the electrofusion joint is damaged, defects such as plastic deformation or micro cracks may occur inside the electrofusion joint and thus the micro conductive network in the body material of the electrofusion joint is damaged. Therefore, the conductivity of the body material of the electrofusion joint is reduced, and the measured monitored resistance of the electrofusion joint is increased accordingly.

In an embodiment, the to-be-monitored electrofusion joint may be a short carbon fiber-reinforced plastic electrofusion pipe fitting with strain self-monitoring function proposed in the prior researches by the team of the inventor, and include but not limited to a well-known electrofusion joint disclosed in the patent documents such as Chinese patent applications ZL201910147997.6, ZL201911289769.9, ZL202110042251.6, ZL202010793068.5 and ZL201911403395.9. Taking an electrofusion joint with a Dn of 110 mm as an example, the body material of the electrofusion joint is a short carbon fiber-reinforced polyethylene conductive composite material. Due to excellent conductivity of the carbon fiber material, the micro conductive network formed by the carbon fibers filled in the polyethylene matrix can increase the conductivity of the composite material. Furthermore, the to-be-monitored electrofusion joint may further be another type of conductive electrofusion pipe fitting.

Figure 2:
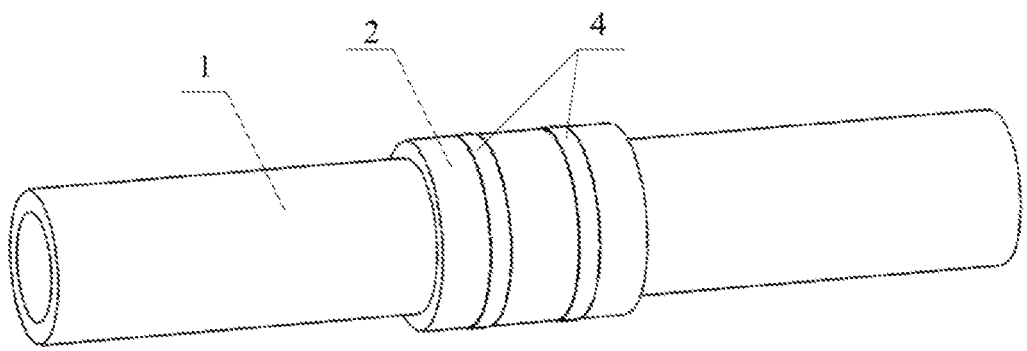
FIG. 2 is a schematic diagram illustrating an electrofusion joint according to one or more embodiments of the present disclosure.

FIG. 2 is a schematic diagram illustrating an electrofusion joint according to one or more embodiments of the present disclosure. As shown in FIG. 2, paired monitoring electrodes 4 are bonded to a surface of the electrofusion joint to measure a resistance of the body material of the electrofusion joint between the two monitoring electrodes. When the electrofusion joint is damaged, defects such as plastic deformation or micro cracks may occur inside the electrofusion joint and thus the micro conductive network in the body material of the electrofusion joint is damaged. Thus, the conductivity of the body material of the electrofusion joint is reduced, and the measured monitored resistance of the electrofusion joint is increased accordingly. For this reason, by measuring a resistance change of the electrofusion joint, a damage state of the electrofusion joint can be monitored.

Figure 3A:
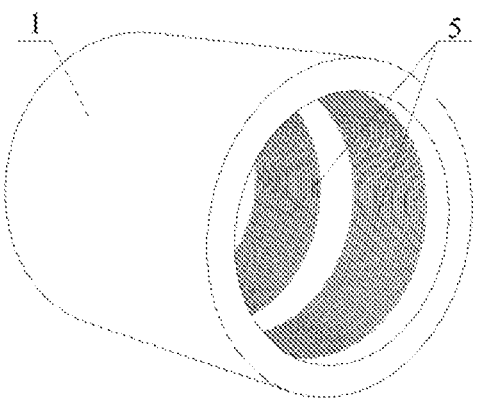
FIG. 3(a) is a schematic diagram illustrating an electrofusion joint according to one or more embodiments of the present disclosure.
Figure 3B:
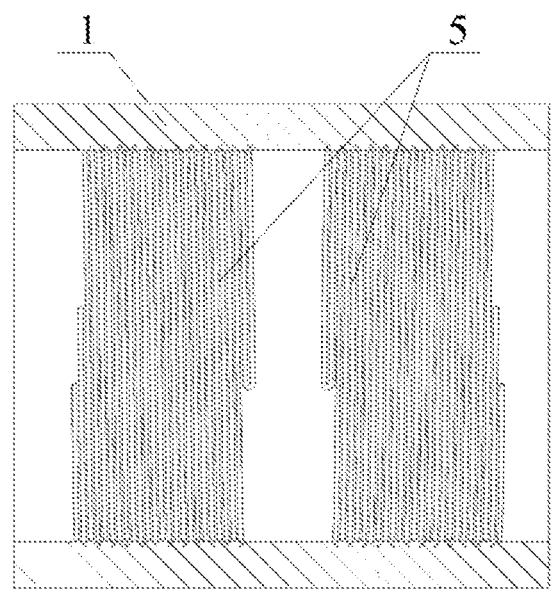
FIG. 3(b) is a sectional view of the electrofusion joint in FIG. 3(a).

FIG. 3(a) is a schematic diagram illustrating an electrofusion joint according to one or more embodiments of the present disclosure, and FIG. 3(b) is a sectional view of the electrofusion joint in FIG. 3(a). As shown in FIGS. 3(a) and 3(b), a welding resistance wire welded on an inner surface of the electrofusion joint may be a segmented resistance wire 5, where two segments of resistance wire are mutually independent and are not in communication with each other and used as monitoring electrodes. Hence, the resistance of the body material of the electrofusion joint between the monitoring electrodes can be measured.

In the present disclosure, the database is configured to store a first damage critical value and a second damage critical value, the monitored resistance data collected by the data collecting module 3, data processed by the data processing module, and data processed by the damage determining module.

In an embodiment of the present disclosure, the first damage critical value and the second damage critical value are critical values for the electrofusion joint on damage, which are related to the material property and construction of the electrofusion joint itself and can be fixed values. In some examples, the first damage critical value and the second damage critical value are different values selected from a plurality of characteristic values including: a monitored resistance value of the electrofusion joint on damage, a change value of monitored resistance of the electrofusion joint on damage, a change rate of monitored resistance value of the electrofusion joint on damage, a slope change rate of relative change curve of monitored resistances of the electrofusion joint on damage and the like.

In some embodiments, the monitored resistance value of the electrofusion joint on damage indicates a resistance value of the electrofusion joint monitored when damage occurs to the electrofusion joint; and the change value of monitored resistance of the electrofusion joint on damage indicates a value obtained by subtracting an initial resistance value from the monitored resistance value of the electrofusion joint when damage occurs to the electrofusion joint. In some embodiments, the change rate of monitored resistance value of the electrofusion joint on damage indicates a ratio between an absolute change value of monitored resistance of the electrofusion joint when damage occurs to the electrofusion joint and the initial resistance value; and the slope change rate of relative change curve of monitored resistances of the electrofusion joint on damage indicates a ratio between slopes of a relative change curve of monitored resistances of the electrofusion joint within two time periods respectively before and after the time when damage occurs to the electrofusion joint.

An advantage for the foregoing manner of selecting the first damage critical value and the second damage critical value is that: the above parameters can be obtained by simply measuring the monitored resistance of the electrofusion joint or by calculation after measurement of the monitored resistance of the electrofusion joint. By using the first damage critical value and the second damage critical value as critical values for damage determination instead of using a single value, the damage to the electrofusion joint can be more accurately monitored. In a production process of electrofusion joints, the distribution of the filled conductive composite material cannot be accurately controlled, and thus the initial resistance values and the resistance values on damage of different electrofusion joints may be different. By referring to a single critical value as a standard for damage determination, accuracy cannot be well controlled.

Moreover, these values may be obtained by performing a burst test on a same batch of electrofusion joint specimens in advance and calculating the test results, and then pre-stored in the database. The electrofusion joint specimens have substantially the same material and structure as the to-be-monitored electrofusion joint, and may be electrofusion joints produced in the same production batch with the same production process as the to-be-monitored electrofusion joint. In some examples, the first damage critical value and the second damage critical value are obtained by: applying an internal pressure load to a plurality of electrofusion joint specimens; monitoring resistances of the plurality of electrofusion joint specimens; for each of the characteristic values, calculating an average value or a minimum value of the characteristic value according to the monitored resistances of the plurality of electrofusion joint specimens on damage; and determining the first damage critical value based on the average value or the minimum value of a first one of the characteristic values, and determining the second damage critical value based on the average value or the minimum value of a second one of the characteristic values. The average value calculated based on several tests can more accurately represent the critical value of the electrofusion joint on damage. The minimum value calculated based on several tests can represent a reference value of the electrofusion joint used in a scene where higher requirements are proposed for the safety performance.

In an embodiment, the first damage critical value may be a change rate of monitored resistance value of the electrofusion joint on damage, where the change rate of monitored resistance value of the electrofusion joint on damage indicates a ratio between an absolute change value of a resistance value of the electrofusion joint monitored when damage occurs to the electrofusion joint relative to the initial resistance value and the initial resistance value; the second damage critical value may be a slope change rate of relative change curve of monitored resistances of the electrofusion joint on damage, where the slope change rate of relative change curve of monitored resistances of the electrofusion joint on damage indicates a ratio between slopes of a relative change curve of monitored resistances of the electrofusion joint within two time periods respectively before and after the time when damage occurs to the electrofusion joint.

In another embodiment, the first damage critical value may be a monitored resistance value of the electrofusion joint on damage, where the monitored resistance value of the electrofusion joint on damage indicates a resistance value of the electrofusion joint monitored when damage occurs to the electrofusion joint; the second damage critical value may be a change value of monitored resistance of the electrofusion joint on damage, where the change value of monitored resistance of the electrofusion joint on damage indicates a value obtained by subtracting the initial resistance value from the resistance value of the electrofusion joint monitored when damage occurs to the electrofusion joint.

The data processing module is configured to process the monitored resistance data collected by the data collecting module 3 to obtain a first monitored value and a second monitored value. The first monitored value and the second monitored value are real-time monitored values of the electrofusion pipe fitting and respectively correspond to the first damage critical value and the second damage critical value, which are also different values selected from the characteristic values: a monitored resistance value, a change value of monitored resistance, a change rate of monitored resistance value, and a slope change rate of relative change curve of monitored resistances and the like.

The damage determining module is configured to compare the first monitored value with the first damage critical value and compare the second monitored value with the second damage critical value, and determine the electrofusion joint is damaged in response to determining at least one of: the first monitored value being greater than the first damage critical value or the second monitored value being greater than the second damage critical value.

In an embodiment, the system for monitoring damage of electrofusion joints can be connected to a plurality of electrofusion joints to perform damage monitoring on the plurality of electrofusion joints at the same time. In some examples, the system includes one or more data collecting modules 3 connected to the plurality of electrofusion joints and configured to perform damage monitoring on the plurality of electrofusion joints at the same time. In some examples, each data collecting module is connected to a respective electrofusion joint of the plurality of electrofusion joints and configured to perform damage monitoring on the respective electrofusion joint at the same time as another data collecting module performs damage monitoring on another respective electrofusion joint.

In an embodiment, the system for monitoring damage of electrofusion joints in the present disclosure further includes a result displaying module, configured to display information received from the damage determining module, e.g., the information indicating whether an electrofusion joint is damaged. The result displaying module may be an LED screen, a liquid crystal display, a tablet computer, a smart phone, or any other intelligent terminal.

Figure 4:
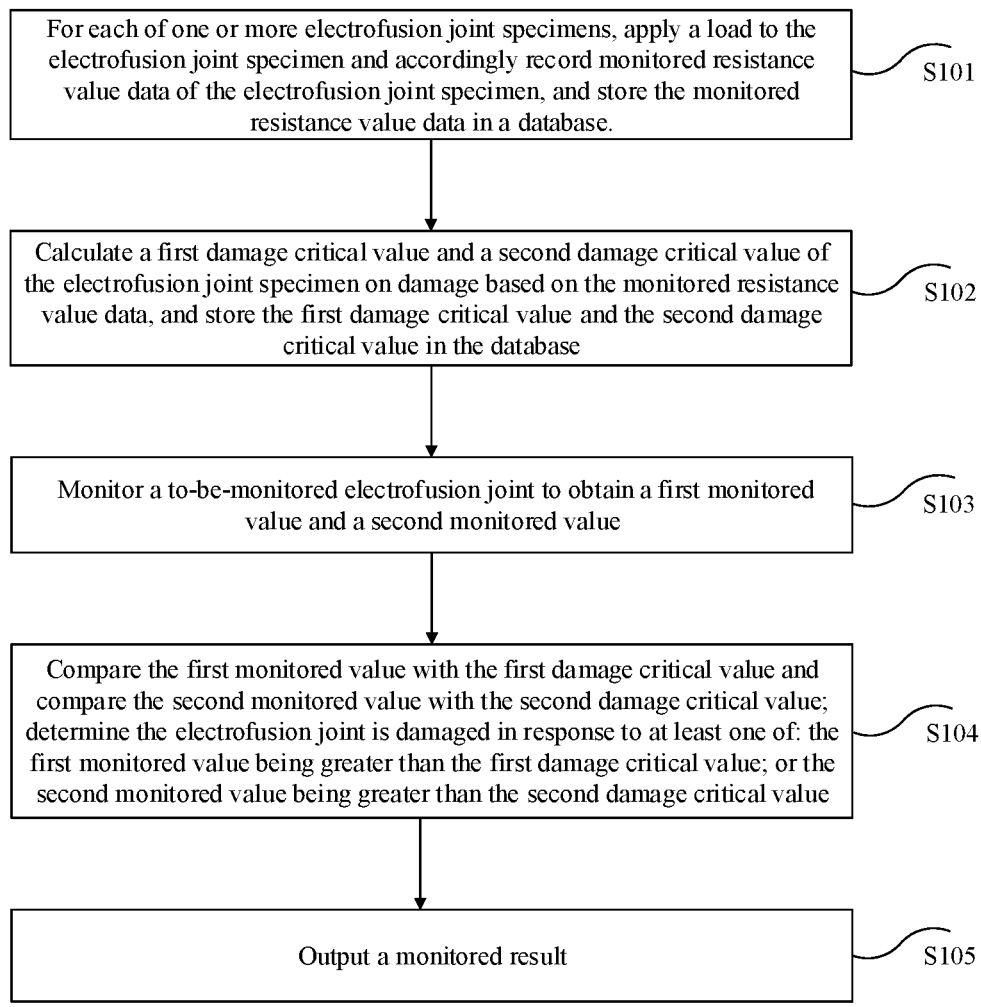
FIG. 4 is a flowchart of a process illustrating a method of monitoring damage of electrofusion joints according to one or more embodiments of the present disclosure.

FIG. 4 is a flowchart of a process illustrating a method of monitoring damage of electrofusion joints according to one or more embodiments of the present disclosure. As shown in FIG. 4, the present disclosure provides a method of monitoring damage of electrofusion joints, which includes the following steps S101 to S106.

At step S101, for each of one or more electrofusion joint specimens, a load is applied to the electrofusion joint specimen, and monitored resistance value data of the electrofusion joint specimen is accordingly recorded and then stored in a database. The monitored resistance value data at least includes an initial resistance value, a resistance value on damage, and resistance change values within a plurality of time periods between an initial time and a damage time when damage occurs to the electrofusion joint specimen.

At step S102, a first damage critical value and a second damage critical value of the electrofusion joint specimen on damage are calculated based on the monitored resistance value data and stored in the database.

At step S103, a to-be-monitored electrofusion joint is monitored to obtain a first monitored value and a second monitored value.

At step S104, the first monitored value is compared with the first damage critical value and the second monitored value is compared with the second damage critical value; it is determined that the electrofusion joint is damaged in response to determining at least one of: the first monitored value being greater than the first damage critical value or the second monitored value being greater than the second damage critical value.

At step S105, a monitored result is output.

In some embodiments, the step of storing the monitored resistance value data in step S101 may be performed after step S102, which is not limited herein.

The first damage critical value and the second damage critical value are already recorded as above and will not be repeated herein. During a damage monitoring process of an electrofusion joint, accurate quantitative representation for the damage degree of the electrofusion joint is a basic job. The quantitative representation for the damage degree of the electrofusion joint will be further described in details below.

Figure 5:
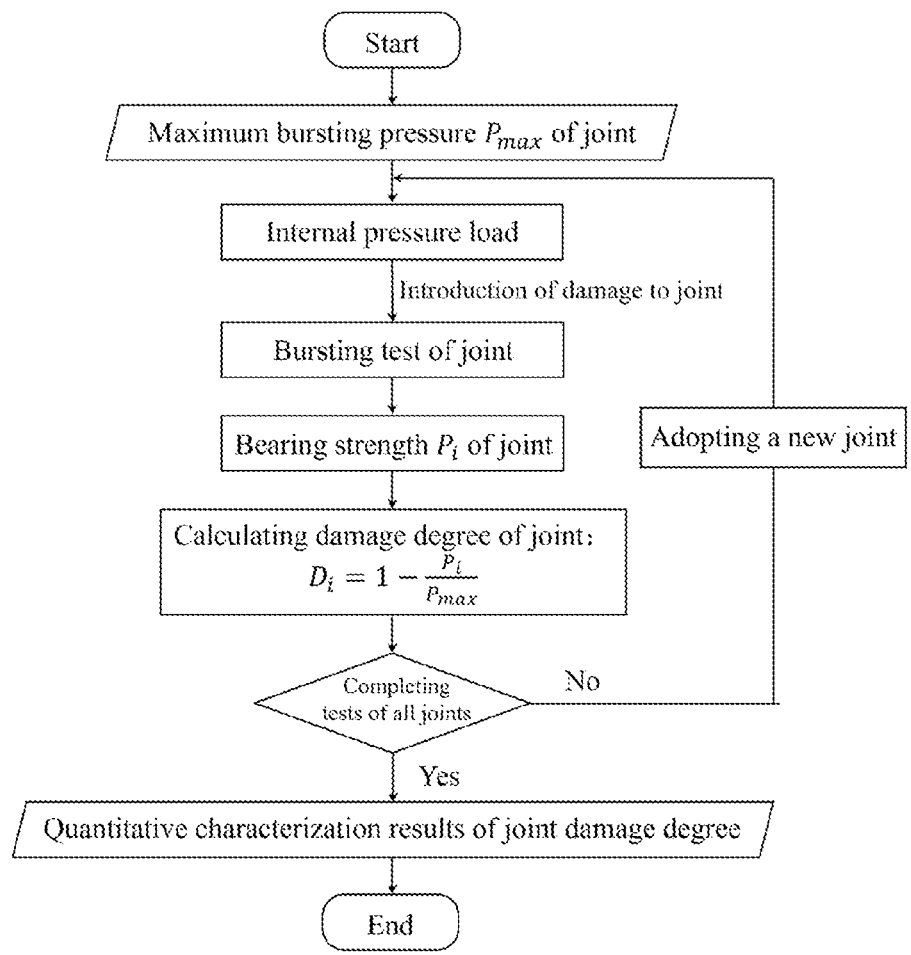
FIG. 5 is a flowchart of a process for quantitatively representing a damage of electrofusion joints according to one or more embodiments of the present disclosure.

FIG. 5 is a flowchart of a process for quantitatively representing a damage of electrofusion joints according to one or more embodiments of the present disclosure. As shown in FIG. 5, the quantitative representation for the damage degree of electrofusion joint can be performed by applying an internal pressure load to the electrofusion joints to produce different degrees of joint damage and establishing an association relationship between the internal pressure of joint and the damage degree of joint, which includes the following steps A to C.

At step A, introduction of damage to the electrofusion joint: an internal pressure load is applied to the electrofusion joint to produce a damage to the joint.

At step B, measurement of strength of the electrofusion joint: a bearing strength of the electrofusion joint after damage is measured through a burst test.

At step C, calculation of the damage degree of the electrofusion joint: the damage degree of the electrofusion joint is defined as a reduction degree of the bearing strength of the joint and thus the damage degree of the electrofusion joint after an internal pressure is loaded is calculated as follows:

$$D_i = 1 - \frac{P_i}{P_{max}} \quad (1)$$

where $D_i$ represents a damage degree of the electrofusion joint after an internal pressure of i MPa is loaded, which ranges between 0 and 1, where 0 represents no damage and 1 represents full damage; $P_i$ represents a bearing strength of the electrofusion joint after an internal pressure of i Mpa is loaded; and $P_{max}$ represents a maximum bearing strength of the electrofusion joint without damage.

The steps A to C are repeated for a plurality of electrofusion joints to obtain the damage degrees of the electrofusion joints under different internal pressures.

Figure 6A:
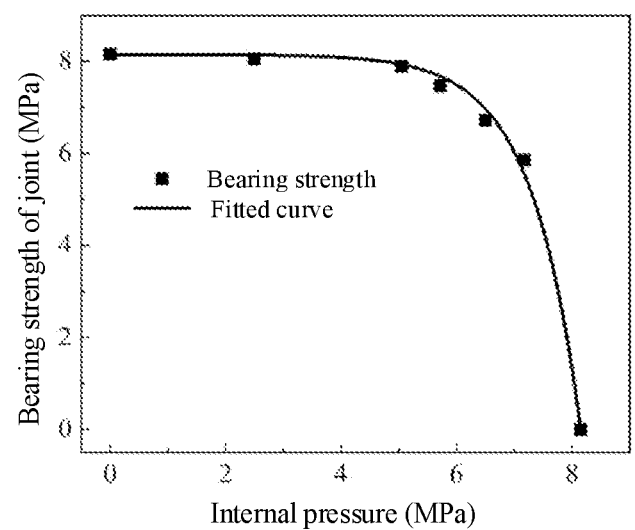
FIGS. 6(a) and 6(b) show results for quantitatively representing a damage of electrofusion joints according to one or more embodiments of the present disclosure, where
Figure 6B:
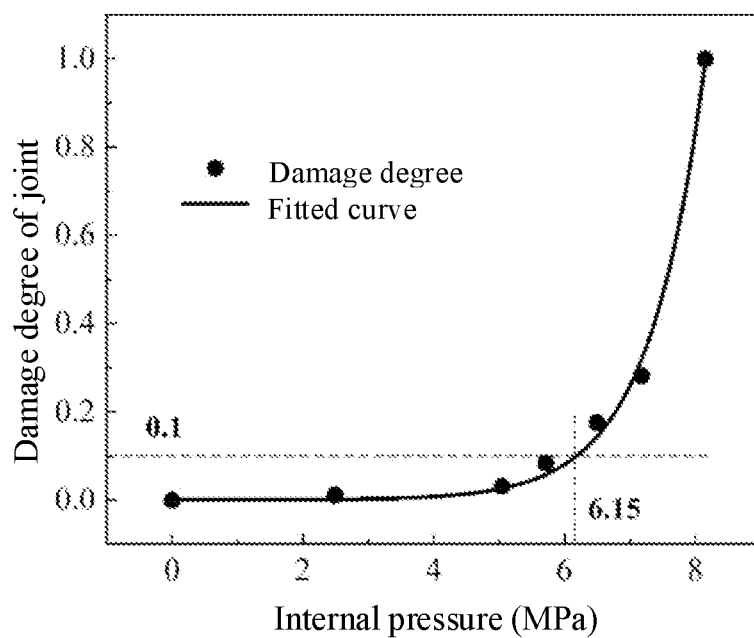

FIGS. 6(a) and 6(b) show results for quantitatively representing a damage of electrofusion joint according to an embodiment of the present disclosure, where FIG. 6(a) is a curve illustrating a relationship between a bearing strength and an internal pressure of an electrofusion joint, and FIG. 6(b) is a curve illustrating a relationship between a damage degree and an internal pressure of an electrofusion joint. As shown in FIGS. 6(a) and 6(b), along with the increase of the internal pressure, in the stage of the internal pressure of 0 to 4 MPa, the bearing strength of the joint firstly undergoes a smooth process in which the bearing strength of the joint changes little; in the stage of the internal pressure of 5 to 7 MPa, the bearing strength of the joint starts to change much, and a damage occurs to the joint; when the internal pressure reaches 8 MPa, the bearing strength of the joint is close to 0 and the joint is substantially fully damaged. It can be known that when the internal pressures of 2.49 MPa and 5.04 MPa are applied to the electrofusion joint, its bearing strength is not visibly reduced. Along with further increase of the internal pressure, for example, when the internal pressures of 6.50 MPa and 7.17 MPa are applied to the electrofusion joint, the bearing strength of the electrofusion joint is obviously reduced.

The above result shows that joint damage may be produced by applying an internal pressure load to the electrofusion joint, leading to reduced bearing strength of the joint. The larger the internal pressure applied is, the lower the bearing strength of the joint is and the higher the damage degree of the joint is. To quantitatively analyze the damage degrees of the joint introduced under different internal pressure loads, the damage degree of the electrofusion joint can be calculated in the formula (1).

When a lower internal pressure is loaded, the bearing strength of the electrofusion joint is substantially not reduced and the corresponding joint damage degree substantially is 0. When an internal pressure loaded is about 6 MPa, the bearing strength of the electrofusion joint starts to decrease obviously, and the corresponding joint damage degree is obviously increased. When the loaded internal pressure continues to increase, the damage degree of the electrofusion joint is increased quickly.

By the above damage quantitative representation test, an association relationship between the loaded internal pressure and the damage degree of the electrofusion joint is established. Set a critical value of the damage degree of the electrofusion joint as 0.1 (may be another value), indicating that an obvious damage occurs to the electrofusion joint when the damage degree of the electrofusion joint is greater than 0.1. According to the damage degree-internal pressure curve, the internal pressure value corresponding to the critical value of the damage degree of the electrofusion joint is determined as 6.15 MPa.

In the following practical cases, with a relative change critical value of the resistance as the first damage critical value and a critical value of a slope change rate of relative change curve of the resistance as the second damage critical value, the systems and methods for monitoring damage of electrofusion joints of the present disclosure will be further described.

Figure 7:
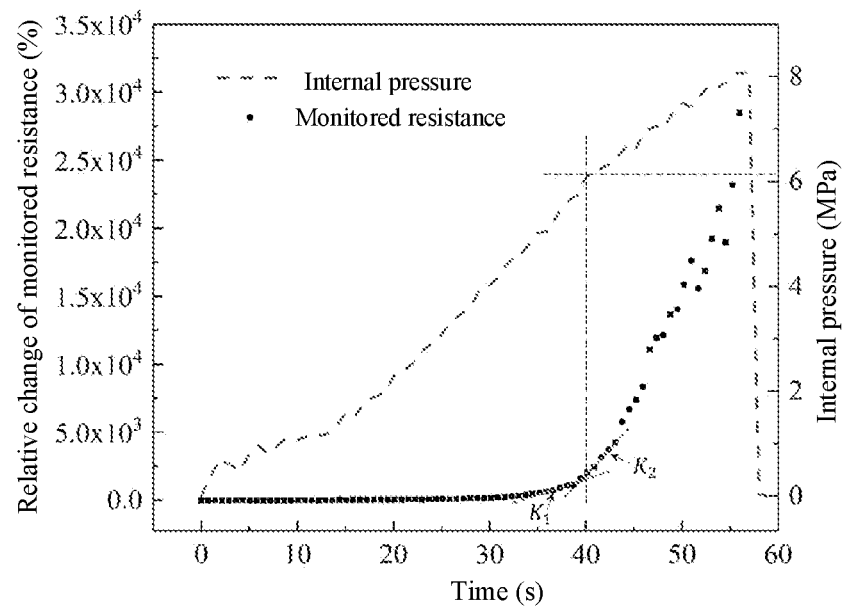
FIG. 7 shows a change curve of a monitored resistance and an internal pressure for an electrofusion joint over time in a process in which an internal pressure load is applied to the electrofusion joint until failure of the electrofusion joint according to one or more embodiments of the present disclosure.

FIG. 7 shows a change curve of a monitored resistance and an internal pressure for an electrofusion joint over time in a process in which an internal pressure load is applied to the electrofusion joint until failure of the electrofusion joint according to one or more embodiments of the present disclosure. The monitoring electrodes for the electrofusion joint are connected to a resistance measuring system. When an internal pressure load is applied to the electrofusion joint until failure of the joint, different degrees of damages can be produced in the electrofusion joint and a monitored resistance change of the joint in this process is collected and recorded as shown in FIG. 7. FIG. 7 is a relative change curve of monitored resistance for the electrofusion joint measured in a bursting process of the electrofusion joint. The relative change curve of monitored resistance for the electrofusion joint in a bursting process has obvious regularity. In the stage of low pressure, the monitored resistance of the joint changes little and can be substantially neglected. Before failure of the electrofusion joint, the monitored resistance of the joint is on continuous quick increase. Therefore, the monitored resistance of the electrofusion joint shows two different change tendencies at the early stage of load and just before the failure of the electrofusion joint, which indicates that a damage occurs to the electrofusion joint at an inflection point of the curve of the monitored resistance, leading to quick increase of the monitored resistance of the joint.

Based on the relative change curve of monitored resistance for the electrofusion joint in FIG. 7, a slope of the relative change curve of monitored resistance within any time range can be calculated, so as to calculate a critical value $K_c$ of a slope change rate of relative change curve of monitored resistance for the electrofusion joint on damage.

Figure 8:
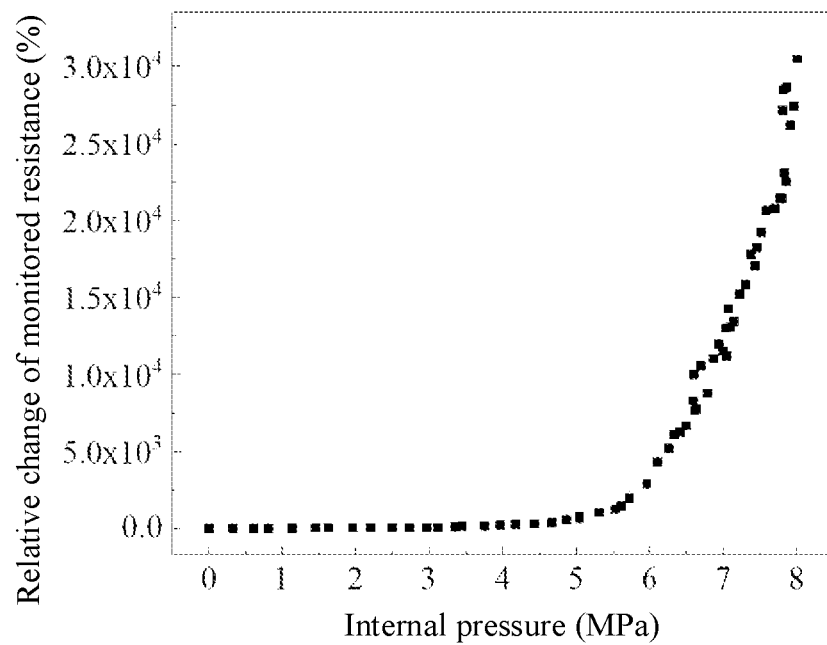
FIG. 8 shows a change curve of a monitored resistance for an electrofusion joint along with an internal pressure in a process in which an internal pressure load is applied to the electrofusion joint until failure of the electrofusion joint according to one or more embodiments of the present disclosure.

FIG. 8 shows a change curve of a monitored resistance for an electrofusion joint along with an internal pressure in a process in which an internal pressure load is applied to the electrofusion joint until failure of the electrofusion joint according to one or more embodiments of the present disclosure. The change curve of the monitored resistance over time obtained through the above bursting process of the electrofusion joint is converted into a change curve of the monitored resistance along with the internal pressure, as shown in FIG. 8.

Figure 9:
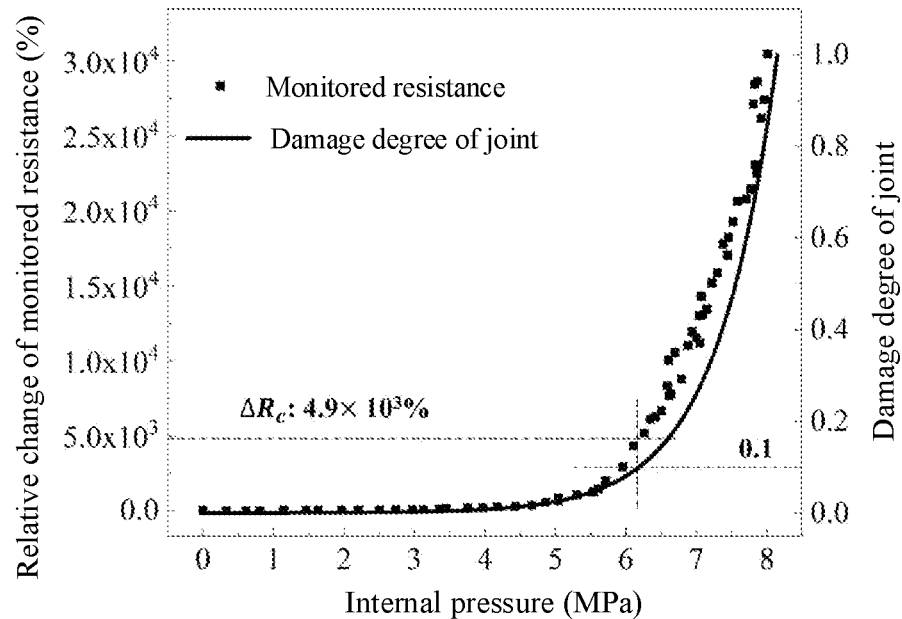
FIG. 9 shows a comparison result between a monitored resistance and a damage degree of an electrofusion joint according to one or more embodiments of the present disclosure.

FIG. 9 shows a comparison result between a monitored resistance and a damage degree of an electrofusion joint according to one or more embodiments of the present disclosure. As shown in FIG. 9, the relative change curve of monitored resistance for the electrofusion joint and the damage degree curve for the joint substantially coincide with each other in change tendency. When an internal pressure of the electrofusion joint is low, the relative change of monitored resistance of the electrofusion joint can be substantially neglected. Accordingly, the corresponding damage degree of the electrofusion joint is close to 0, which indicates the joint is in a safe state. Before failure of the electrofusion joint, the damage degree of the joint increases continuously and to 1 at the time of failure of burst and the monitored resistance of the electrofusion joint corresponding to this stage is on continuous quick increase. The result shows that the change of monitored resistance of the electrofusion joint is in good correspondence with the damage degree of the joint, and the change of monitored resistance of the electrofusion joint measured can be used to represent the damage to the electrofusion joint.

Setting a critical value of the damage degree of the electrofusion joint as 0.1 (may be another value), indicates that an obvious damage occurs to the electrofusion joint when the damage degree of the electrofusion joint is greater than 0.1. According to the damage degree-internal pressure curve, the internal pressure value corresponding to the critical value of the damage degree of the electrofusion joint is determined as 6.15 MPa. It can be known from the comparison result of FIG. 9 that the relative change rate of monitored resistance at this time is $4.9\times10^3\%$, and thus, it is determined that the relative change $\Delta R_c$ of monitored resistance for the joint on damage is $4.9\times10^3\%$. A plurality of critical values may be obtained based on the relative change curves of monitored resistances for a plurality of electrofusion joints during burst, and $\Delta R_c$ is determined by calculating an average value or a minimum value among these results.

Setting a critical value of the damage degree of the electrofusion joint as 0.1 (may be another value), indicates that an obvious damage occurs to the electrofusion joint when the damage degree of the electrofusion joint is greater than 0.1. According to the damage degree-internal pressure curve, the internal pressure value corresponding to the critical value of the damage degree of the electrofusion joint is determined as 6.15 MPa. It can be determined from FIG. 7 that the corresponding test time at this time is about 40 s. The slopes $K_1$ and $K_2$ of the relative change curve of monitored resistance within $\Delta t$ (e.g. $\Delta t$ is 5 s) time range before and after the test time can be calculated. For the curve in FIG. 7, $K_1$ is a slope of the curve within the time range of 35 to 40 s, which is calculated as 320.11% $s^{-1}$ in the following formula; $K_2$ is a slope of the curve within the time range of 40 to 45 s, which is calculated as 1099.19% $s^{-1}$ in the following formula.

$$K_1 = \frac{\Delta R_{40} - \Delta R_{35}}{5} = \frac{2062.71\% - 462.14\%}{5} = 320.11\% \ s^{-1}$$
$$K_2 = \frac{\Delta R_{45} - \Delta R_{40}}{5} = \frac{7558.66\% - 2062.71\%}{5} = 1099.19\% \ s^{-1}$$

Thus, a critical value $K_c$ of a slope change rate of relative change curve of monitored resistance for the electrofusion joint on damage is calculated as follows:

$$K_c = \frac{K_2}{K_1} = \frac{1099.19\%}{320.11\%} = 3.43$$

As mentioned above, the critical value $\Delta R_c$ of the relative change of monitored resistance for the joint on damage (i.e. the first damage critical value) and the critical value $K_c$ of the slope change rate of relative change curve of monitored resistance (i.e. the second damage critical value) are determined.

Figure 10:
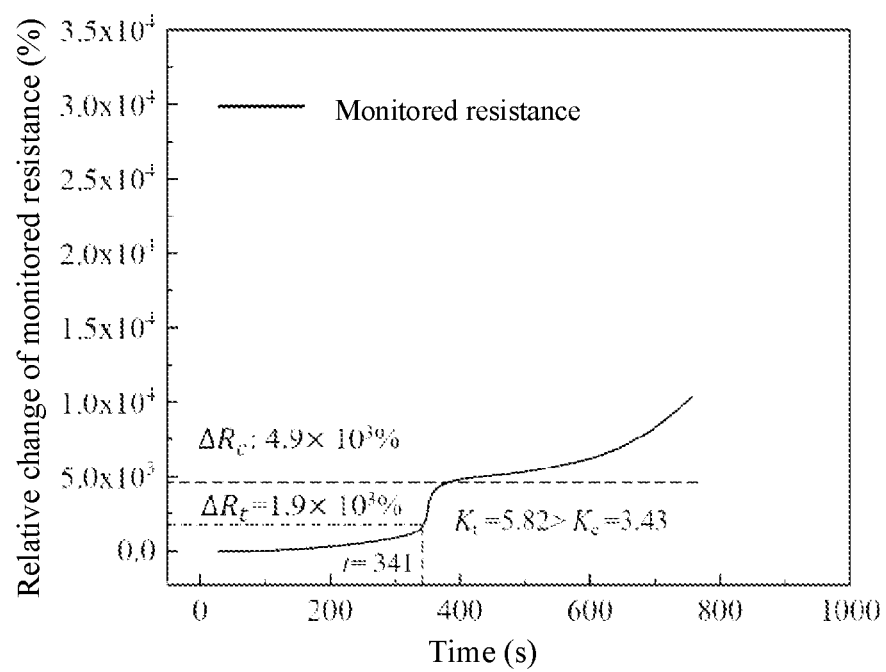
FIG. 10 shows a change curve of a resistance in a damage monitoring process of an electrofusion joint according to one or more embodiments of the present disclosure.

FIG. 10 shows a change curve of a resistance in a damage monitoring process of an electrofusion joint according to an embodiment of the present disclosure. As shown in FIG. 10, during a damage monitoring process of the electrofusion joint, the relative change value of monitored resistance for the electrofusion joint continuously increases. The data processing module calculates, in real time, the relative change value $\Delta R_t$ of monitored resistance as a first monitored value and a slope change rate $K_t$ of relative change curve of monitored resistance for the electrofusion joint as a second monitored value. When the time t=341 seconds, since a damage defect occurs to the electrofusion joint, the monitored resistance increases quickly. At this time, the calculated second monitored value of the electrofusion joint is $K_t$=5.82. Although the first monitored value $\Delta R_t$=1.9× $10^3\%$ of the electrofusion joint at this time is far less than the first damage critical value $\Delta R_c$ ($\Delta R_e$=4.9×$10^3\%$) of the electrofusion joint, since the second monitored value $K_t$ is greater than the second damage critical value $K_c$ ($K_e$=3.43), the damage determining module determines that a damage occurs to the electrofusion joint at this time.

Figure 11:
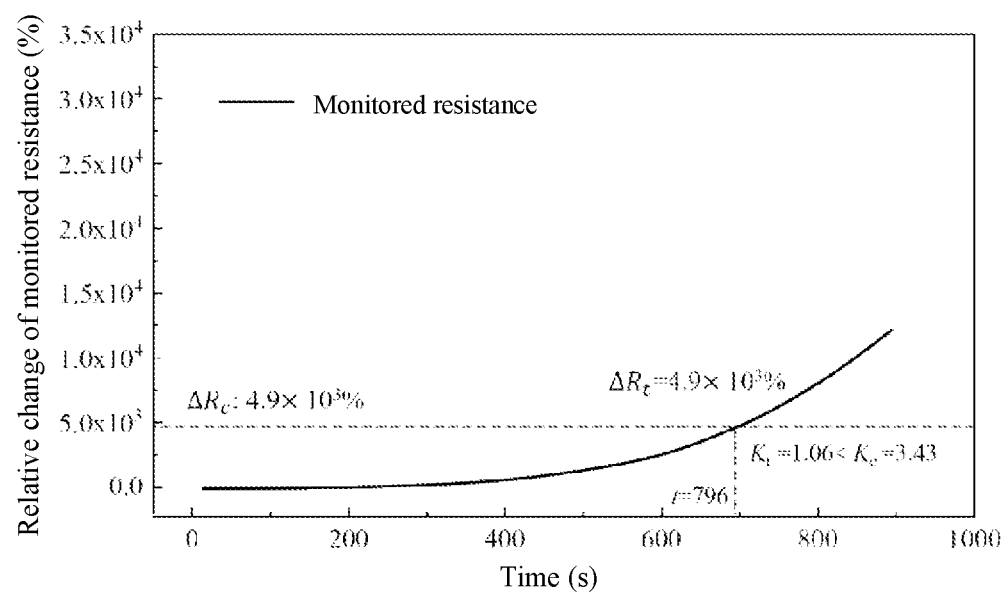
FIG. 11 shows a change curve of a resistance in a damage monitoring process of an electrofusion joint according to one or more embodiments of the present disclosure.

FIG. 11 shows a change curve of a resistance in a damage monitoring process of an electrofusion joint according to another embodiment of the present disclosure. As shown in FIG. 11, in a damage monitoring process of the electrofusion joint, the relative change value of monitored resistance of the electrofusion joint continuously increases. The data processing module calculates, in real time, the relative change value $\Delta R_t$ of monitored resistance as a first monitored value and a slope change rate $K_t$ of relative change curve of monitored resistance for the electrofusion joint as a second monitored value. In the entire test process of the electrofusion joint, the relative change value of monitored resistance increases smoothly without any spike of the curve. But, under an in-service load of long time, damages such as cracks or crack propagation may slowly appear inside the joint, leading to slow increase of the monitored resistance value of the electrofusion joint. When t=796 minutes, the monitored resistance value of the electrofusion joint exceeds the critical value, namely, the first monitored value $\Delta R_t$ of the electrofusion joint at this time starts to exceed the first damage critical value ($\Delta R_e$=4.9×$10^3\%$) of the electrofusion joint. Although the second monitored value $K_t$=1.06 at this time is far less than the second damage critical value $K_c$ ($K_c$=3.43) of the electrofusion joint, since the first monitored value $\Delta R_t$ is greater than the first damage critical value $\Delta R_c$, the damage determining module determines that a damage occurs to the electrofusion joint at this time.

The relative change of monitored resistance and the slope change rate of relative change curve of monitored resistance for the electrofusion joint at any time can be calculated by similar method. Based on this, the first monitored value and the second monitored value of the electrofusion joint at any time t may be obtained; the first monitored value is compared with the first damage critical value and the second monitored value is compared with the second damage critical value; and the damage determining module determines that the electrofusion joint is damaged in response to at least one of: the first monitored value being greater than the first damage critical value; or the second monitored value being greater than the second damage critical value. Thus, the damage state of the electrofusion joint can be determined.

Those skilled in the art can fully understand from the above embodiments that the first damage critical value and the second damage critical value can be combined by selecting two different values from the following values so as to specifically implement the technical solution of the present disclosure: a monitored resistance value on damage, a change value of monitored resistance, a change rate of monitored resistance value, and a slope change rate of relative change curve of monitored resistance. In this way, multiple combinations of the first damage critical value and the second damage critical value may be obtained. Those skilled in the art can fully understand from the above embodiment that its specific implementation is substantially similar to the above application case and will not be repeated herein.

Compared with the prior art, one or more technical solutions of the embodiments of the present disclosure at least have the following technical effects or advantages.

(1) In the systems and methods for monitoring damage of electrofusion joints according to the present disclosure, based on the sensing characteristics of the body material of the electrofusion joint, real-time monitoring and evaluation on the damage state of the electrofusion joint can be achieved without an external sensor, thus increasing the safety and reliability of the non-metallic pipe.

(2) In the systems and methods for monitoring damage of electrofusion joints according to the present disclosure, damage monitoring for the electrofusion joint is performed by using multiple critical values of different dimensions, so as to overcome the problem of uncertainty and inaccuracy resulting from performing monitoring by using a single critical value.

(3) In the present disclosure, determination is performed by combination of damage critical values, such that a damage occurring in a short time can be monitored in real time and damage initiation and slow propagation under an in-service load of long time can also be monitored.

(4) In the present disclosure, the damage degree of the electrofusion joint is quantitatively represented and in combination with the measurement data of the monitored resistance of the electrofusion joint, key parameters for damage evaluation of the electrofusion joint are obtained: a change rate of monitored resistance value, and a slope change rate of relative change curve of monitored resistance; and damage critical values are determined. Thus, basic data is provided for determining a damage of the electrofusion joint based on resistance measurement.

It is to be noted that logics and/or steps represented or described another way in the flowchart, for example, may be considered as a sequence list of executable instructions for implementing logical functions and can be specifically implemented in any computer readable medium for use by the instruction executing systems, apparatuses or devices (e.g. a computer-based system, a system including a processor, or another system for obtaining and executing instructions from the instruction executing systems, apparatuses or devices), or use in combination with these instruction executing systems, apparatuses or devices. In the specification, "computer readable medium" may be any apparatus capable of containing, storing, communicating, disseminating or transmitting programs for use by the instruction executing systems, apparatuses or devices or use in combination with the instruction executing systems, apparatuses or devices. The more specific examples of the computer readable medium (non-exhaustive list) include: an electrically-connected part having one or more wires (electronic apparatus), a portable computer cassette (magnetic apparatus), a random access memory (RAM), a read only memory (ROM), an erasable programmable read-only memory (EPROM or flash memory), an optical fiber apparatus, and a portable compact disk ROM (CDROM). Furthermore, the computer readable medium may even be a paper or another proper medium on which programs are printed, because, for example, optical scan can be performed on the paper or another medium and then edited, interpreted or if necessary, processed in another proper way to electronically obtain the programs and then store the programs in the computer memory.

It should be understood that, each part of the present disclosure can be implemented by hardware, software, firmware or a combination thereof. In the above embodiments, multiple steps or methods may be implemented by using a software or a firmware stored in the memory and executable by a proper instruction executing system. For example, if the multiple steps or methods are implemented by using a hardware, as in another embodiment, they can be implemented by any one of the following technologies well known in the field or a combination thereof: a discrete logic circuit having a logic gate circuit for implementing logic functions for data signals, a dedicated integrated circuit having a proper combination logic gate circuit, a programmable gate array (PGA), a field programmable gate array (FPGA), or the like.

In the descriptions of the specification, the reference terms "one embodiment", "preferred embodiment", "example" "specific example" or "some examples" or the like are intended to mean specific features, structures, material or characteristics described in combination with the embodiment or the example are included in at least one embodiment or example of the present disclosure. In the specification, the illustrative expressions of the above terms do not necessarily refer to same embodiments or examples. Further, the described specific features, structures, materials, or characteristics may be combined in a proper way in one or more embodiments or examples.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is based on the orientation or positional relationship shown in drawings and used only for ease of descriptions and simplification of descriptions rather than indicating or implying that the indicated devices or elements must have a particular orientation, or be constructed or operated in a particular orientation. Therefore, such terms shall not be understood as limiting of the present disclosure.

Further, the terms "first" and "second" used in the embodiments of the present disclosure are used for descriptions only and shall not be understood as indicating or implying relative importance or implicitly indicating the number of the features indicated in the embodiments. As a result, the features defined by "first" and "second" in the embodiments of the present disclosure may explicitly or implicitly include at least one of the features. In the descriptions of the present disclosure, the term "several" has the meaning of at least two or two or more, for example, two or three, or four or the like, unless otherwise clearly stated.

In the present disclosure, unless otherwise clearly stated or defined, the terms "mount", "connect", "couple", "fix", or the like in the embodiments shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly over or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Although the embodiments of the present disclosure are already illustrated and described above, it can be understood that the above embodiments are only illustrative and shall not be understood as limiting of the present disclosure. Those skilled in the art can make changes, modifications, replacements or variations to the above embodiments within the scope of the present disclosure.

The invention claimed is:

1. A system for monitoring damage of electrofusion joints of a non-metallic pipe, the system comprising:
a data collector connected to an electrofusion joint of the non-metallic pipe through a pair of monitoring electrodes and configured to collect monitored resistance data of a body material of the electrofusion joint between the pair of monitoring electrodes, wherein the pair of monitoring electrodes is bonded to a surface of the electrofusion joint of the non-metallic pipe;
one or more processors; and
one or more memories coupled to the one or more processors and having instructions stored thereon that are executable by the one or more processors to perform one or more operations comprising:
obtaining a first damage critical value, a second damage critical value, and the monitored resistance data collected by the data collector;
processing the monitored resistance data to obtain a first monitored value and a second monitored value, wherein the first monitored value and the second monitored value are real-time monitored values and respectively correspond to the first damage critical value and the second damage critical value;
comparing the first monitored value with the first damage critical value and comparing the second monitored value with the second damage critical value; and
determining that the electrofusion joint is damaged in response to determining: the first monitored value being greater than the first damage critical value and the second monitored value being greater than the second damage critical value,
wherein the first damage critical value and the second damage critical value are different values selected from a plurality of characteristic values comprising:
a monitored resistance value of the electrofusion joint on damage, indicating a resistance value of the electrofusion joint monitored when damage occurs to the electrofusion joint,
a change value of monitored resistance of the electrofusion joint on damage, indicating a value obtained by subtracting an initial resistance value from the monitored resistance value of the electrofusion joint when damage occurs to the electrofusion joint,
a change rate of monitored resistance value of the electrofusion joint on damage, indicating a ratio between an absolute change value of monitored resistance of the electrofusion joint when damage occurs to the electrofusion joint and the initial resistance value, and
a slope change rate of relative change curve of monitored resistance of the electrofusion joint on damage, indicating a ratio between slopes of a relative change curve of monitored resistances of the electrofusion joint within two time periods respectively before and after a time when damage occurs to the electrofusion joint,
wherein the first damage critical value and the second damage critical value are determined based on a monitored resistance change curve of one or more electrofusion joint specimens and an internal pressure value on damage of electrofusion joint specimens,
wherein the internal pressure value on damage of the electrofusion joint specimens is determined based on a damage degree-internal pressure curve, where the damage degree-internal pressure curve quantitatively represents a damage degree of the electrofusion joint specimens after an internal pressure is loaded, $$D_i = 1 - \frac{P_i}{P_{max}}$$

where $D_i$ represents a damage degree of the electrofusion joint specimen after an internal pressure of i MPa is loaded, $P_i$ represents a bearing strength of the electrofusion joint specimen after the internal pressure of i MPa is loaded, and $P_{max}$ represents a maximum bearing strength of the electrofusion joint specimen without damage, and
wherein the monitored resistance change curve of the electrofusion joint specimen is obtained by applying an internal pressure load to the electrofusion joint specimen and accordingly recording monitored resistance value data of the electrofusion joint specimen, and wherein the monitored resistance value data at least comprises an initial resistance value, a resistance value on damage, and resistance change values within a plurality of time periods between an initial time and a damage time when damage occurs to the electrofusion joint specimen.

2. The system of claim 1, wherein the electrofusion joint comprises a polymer matrix and a conductive filler,
wherein the conductive filler is uniformly distributed in the polymer matrix to form a conductive network,
wherein the polymer matrix comprises at least one of polyethylene, polypropylene, polyvinyl chloride, or polyamide, and
wherein the conductive filler comprises at least one of carbon nanotube, carbon nanofiber, carbon fiber, metal fiber, metal-plated glass fiber, graphene, or carbon black.

3. The system of claim 1, wherein the electrofusion joint specimen and the electrofusion joint are substantially same in material and structure.

4. The system of claim 1, wherein the internal pressure value on damage of the electrofusion joint is determined by:
setting a critical value of the damage degree of the electrofusion joint; and
according to the damage degree-internal pressure curve, determining the internal pressure value on damage of the electrofusion joint as the internal pressure corresponding to the critical value of the damage degree of the electrofusion joint.

5. The system of claim 1, wherein the first damage critical value and the second damage critical value are obtained by:

applying an internal pressure load to a plurality of electrofusion joint specimens;
monitoring resistances of the plurality of electrofusion joint specimens;
for each of the characteristic values, calculating an average value or a minimum value of the characteristic value according to the monitored resistances of the plurality of electrofusion joint specimens on damage; and
determining the first damage critical value based on the average value or the minimum value of a first one of the characteristic values, and determining the second damage critical value based on the average value or the minimum value of a second one of the characteristic values.

6. The system of claim 5, wherein the first monitored value is a change rate of monitored resistance value of electrofusion joint, and
wherein the second monitored value is a slope change rate of relative change curve of monitored resistances of electrofusion joint.

7. The system of claim 1, wherein the system is connected to a plurality of electrofusion joints of the non-metallic pipe and configured to perform damage monitoring on the plurality of electrofusion joints at a same time.

8. The system of claim 1, further comprising a result display,
wherein the operations comprise: displaying information indicating whether an electrofusion joint of the non-metallic pipe is damaged on the result display.

9. A method of monitoring damage of electrofusion joints of a non-metallic pipe, the method comprising:
for each of one or more electrofusion joint specimens,
applying an internal pressure load to the electrofusion joint specimen, and
recording monitored resistance value data of the electrofusion joint specimen to obtain a monitored resistance change curve for the electrofusion joint specimen, wherein the monitored resistance value data at least comprises an initial resistance value, a resistance value on damage, and resistance change values within a plurality of time periods between an initial time and a damage time when damage occurs to the electrofusion joint specimen;
applying an internal pressure load to a plurality of electrofusion joint specimens to produce damage to the plurality of electrofusion joint specimens;
measuring a bearing strength $P_i$ of the plurality of electrofusion joint specimens after damage through burst tests to obtain a damage degree-internal pressure curve of electrofusion joint, where the damage degree-internal pressure curve quantitatively represents a damage degree $D_i$ of the electrofusion joint specimen after an internal pressure of i MPa is loaded;
according to the monitored resistance change curve and the damage degree-internal pressure curve for the electrofusion joint specimen, obtaining a first damage critical value and a second damage critical value of the electrofusion joint specimen on damage;
storing the first damage critical value and the second damage critical value in a database;
monitoring an electrofusion joint of the non-metallic pipe by connecting a pair of monitoring electrodes to the electrofusion joint of the non-metallic pipe, wherein the pair of monitoring electrodes are bonded to a surface of the electrofusion joint of the non-metallic pipe,
collecting monitored resistance data of the electrofusion joint of the non-metallic pipe;
obtaining a first monitored value and a second monitored value based on the monitored resistance data;
comparing the first monitored value with the first damage critical value and comparing the second monitored value with the second damage critical value; and
determining that the electrofusion joint of the non-metallic pipe is damaged in response to determining:
the first monitored value being greater than the first damage critical value, and
the second monitored value being greater than the second damage critical value.

10. The method of claim 9, wherein the first damage critical value is a ratio between an absolute change value of a resistance value monitored when damage occurs to the electrofusion joint specimen relative to the initial resistance value and the initial resistance value,
wherein the second damage critical value is a ratio between slopes of a relative change curve of monitored resistances within two time periods respectively before and after the time when damage occurs to the electrofusion joint specimen,
wherein the first monitored value is a change rate of monitored resistance value for electrofusion joint, and
wherein the second monitored value is a slope change rate of relative change curve of monitored resistance for electrofusion joint.

11. The method of claim 9, wherein, the electrofusion joint specimen and the electrofusion joint are substantially same in material and structure.

12. An apparatus comprising:
one or more processors; and
one or more memories coupled to the one or more processors and having instructions stored thereon that are executable by the one or more processors to perform one or more operations comprising:
obtaining a first damage critical value, a second damage critical value, and monitored resistance data of an electrofusion joint of a non-metallic pipe, wherein the monitored resistance data is obtained by a data collector connected to the electrofusion joint of the non-metallic pipe through a pair of monitoring electrodes bonded to a surface of the electrofusion joint of the non-metallic pipe;
processing the monitored resistance data to obtain a first monitored value and a second monitored value, wherein the first monitored value and the second monitored value are real-time monitored values and respectively correspond to the first damage critical value and the second damage critical value;
comparing the first monitored value with the first damage critical value and comparing the second monitored value with the second damage critical value; and
determining that the electrofusion joint is damaged in response to determining the first monitored value being greater than the first damage critical value and the second monitored value being greater than the second damage critical value; and
displaying information indicating that the electrofusion joint of the non-metallic pipe is damaged on a result display,
wherein the first damage critical value and the second damage critical value are different values selected from a plurality of characteristic values comprising:

a monitored resistance value of the electrofusion joint on damage, indicating a resistance value of the electrofusion joint monitored when damage occurs to the electrofusion joint, a change value of monitored resistance of the electrofusion joint on damage, indicating a value obtained by subtracting an initial resistance value from the monitored resistance value of the electrofusion joint when damage occurs to the electrofusion joint, a change rate of monitored resistance value of the electrofusion joint on damage, indicating a ratio between an absolute change value of monitored resistance of the electrofusion joint when damage occurs to the electrofusion joint and the initial resistance value, and a slope change rate of relative change curve of monitored resistances of the electrofusion joint on damage, indicating a ratio between slopes of a relative change curve of monitored resistances of the electrofusion joint within two time periods respectively before and after a time when damage occurs to the electrofusion joint, wherein the first damage critical value and the second damage critical value are determined based on a monitored resistance change curve of one or more electrofusion joint specimens and an internal pressure value on damage of electrofusion joint specimens, wherein the internal pressure value on damage of the electrofusion joint specimens is determined based on a damage degree-internal pressure curve, where the damage degree-internal pressure curve quantitatively represents a damage degree of the electrofusion joint specimens after an internal pressure is loaded, $$D_i = 1 - \frac{P_i}{P_{max}}$$

where $D_i$ represents a damage degree of the electrofusion joint specimen after an internal pressure of i MPa is loaded, $P_i$ represents a bearing strength of the electrofusion joint specimen after the internal pressure of i MPa is loaded, and $P_{max}$ represents a maximum bearing strength of the electrofusion joint specimen without damage, and wherein the monitored resistance change curve of the electrofusion joint specimen is obtained by applying an internal pressure load to the electrofusion joint specimen and accordingly recording monitored resistance value data of the electrofusion joint specimen, and wherein the monitored resistance value data at least comprises an initial resistance value, a resistance value on damage, and resistance change values within a plurality of time periods between an initial time and a damage time when damage occurs to the electrofusion joint specimen.

13. The apparatus of claim 12, wherein the electrofusion joint comprises a polymer matrix and a conductive filler,
wherein the conductive filler is uniformly distributed in the polymer matrix to form a conductive network,
wherein the polymer matrix comprises at least one of polyethylene, polypropylene, polyvinyl chloride, or polyamide, and
wherein the conductive filler comprises at least one of carbon nanotube, carbon nanofiber, carbon fiber, metal fiber, metal-plated glass fiber, graphene, or carbon black.

14. The apparatus of claim 12, wherein the electrofusion joint specimen and the electrofusion joint are substantially same in material and structure.

15. The apparatus of claim 12, wherein the internal pressure value on damage of the electrofusion joint is determined by:
setting a critical value of the damage degree of the electrofusion joint; and
according to the damage degree-internal pressure curve, determining the internal pressure value on damage of the electrofusion joint as the internal pressure corresponding to the critical value of the damage degree of the electrofusion joint.

16. The apparatus of claim 12, wherein the first damage critical value and the second damage critical value are obtained by:
applying an internal pressure load to a plurality of electrofusion joint specimens;
monitoring resistances of the plurality of electrofusion joint specimens; and
for each of the characteristic values, calculating an average value or a minimum value of the characteristic value according to the monitored resistances of the plurality of electrofusion joint specimens on damage; and
determining the first damage critical value based on the average value or the minimum value of a first one of the characteristic values, and determining the second damage critical value based on the average value or the minimum value of a second one of the characteristic values.

17. The apparatus of claim 16, wherein the first monitored value is a change rate of monitored resistance value of electrofusion joint, and
wherein the second monitored value is a slope change rate of relative change curve of monitored resistances of electrofusion joint.

18. The apparatus of claim 12, wherein the operations further comprise:
receiving respective monitored resistance data of a plurality of electrofusion joints of the non-metallic pipe at a same time; and
determining whether each of the plurality of electrofusion joints is damaged based on the respective monitored resistance data of the electrofusion joint.

* * * * *